(12) United States Patent
Wilkins

(10) Patent No.: US 10,765,099 B1
(45) Date of Patent: Sep. 8, 2020

(54) PORTABLE LIVE WELL FOR ICE FISHING

(71) Applicant: Frank William Wilkins, Blair, NE (US)

(72) Inventor: Frank William Wilkins, Blair, NE (US)

( * ) Notice: Subject to any disclaimer, the term of this patent is extended or adjusted under 35 U.S.C. 154(b) by 418 days.

(21) Appl. No.: 15/841,058

(22) Filed: Dec. 13, 2017

Related U.S. Application Data

(63) Continuation-in-part of application No. 15/385,547, filed on Dec. 20, 2016, now abandoned.

(60) Provisional application No. 62/276,096, filed on Jan. 7, 2016.

(51) Int. Cl.
*A01K 97/20* (2006.01)
*A01K 97/01* (2006.01)
*A01K 97/05* (2006.01)

(52) U.S. Cl.
CPC ............. *A01K 97/20* (2013.01); *A01K 97/01* (2013.01); *A01K 97/05* (2013.01)

(58) Field of Classification Search
CPC ......... A01K 97/01; A01K 97/05; A01K 97/20
USPC .............. 43/54.1, 55, 56; 220/752, 754, 755
See application file for complete search history.

(56) References Cited

U.S. PATENT DOCUMENTS

| | | | | |
|---|---|---|---|---|
| 2,093,132 A * | 9/1937 | Logan | ..................... | A01K 97/05 43/56 |
| 2,799,146 A * | 7/1957 | Meagher | ................ | A01K 97/01 249/66.1 |
| 3,059,451 A * | 10/1962 | Anderson | ................. | F25C 1/22 249/66.1 |
| 3,520,440 A * | 7/1970 | Kinnavy | ............. | B65D 43/022 220/783 |
| 4,718,188 A * | 1/1988 | Roberts | ................. | A01K 97/01 294/14 |
| 5,507,114 A * | 4/1996 | Stricker | ................. | A01K 97/04 43/54.1 |
| 5,970,651 A * | 10/1999 | Torkilsen | ............... | A01K 97/01 206/315.11 |
| 6,581,795 B1 * | 6/2003 | Schulein | ............... | A47G 19/26 126/275 R |
| 6,694,662 B1 * | 2/2004 | McClure | ................ | A01K 97/01 43/4 |
| 6,729,066 B1 * | 5/2004 | Howley | ................. | A01K 97/05 43/54.1 |
| 6,783,018 B1 * | 8/2004 | Rondeau | ................ | A01K 97/05 220/254.3 |
| 7,017,297 B1 * | 3/2006 | Ward | ..................... | A01K 97/20 43/55 |
| 8,607,498 B1 * | 12/2013 | Smith | .................... | A01K 97/05 43/56 |
| 2002/0020104 A1 * | 2/2002 | Kolar | ..................... | A01K 97/05 43/55 |
| 2013/0326931 A1 * | 12/2013 | Schaefbauer | .......... | A01K 97/04 43/55 |
| 2014/0053451 A1 * | 2/2014 | Brown | .................. | A01K 97/01 43/55 |

(Continued)

*Primary Examiner* — Darren W Ark
*Assistant Examiner* — Brady W Frazier
(74) *Attorney, Agent, or Firm* — Plager Schack LLP; Mark H. Plager; Michael J. O'Brien

(57) ABSTRACT

A portable live well is configured to fit through a hole in ice above water. The portable live well includes a lid mechanically coupled to a body. The lid is joined to the body by pushing a large opening outer edge clip and a small opening outer edge clip on the lid into the rim on the body.

5 Claims, 4 Drawing Sheets

(56) References Cited

U.S. PATENT DOCUMENTS

2015/0082686 A1* 3/2015 Merritt .................. A01K 97/20
　　　　　　　　　　　　　　　　　　　　　　　43/55
2018/0104980 A1* 4/2018 Tucker ................... B26B 29/06

* cited by examiner

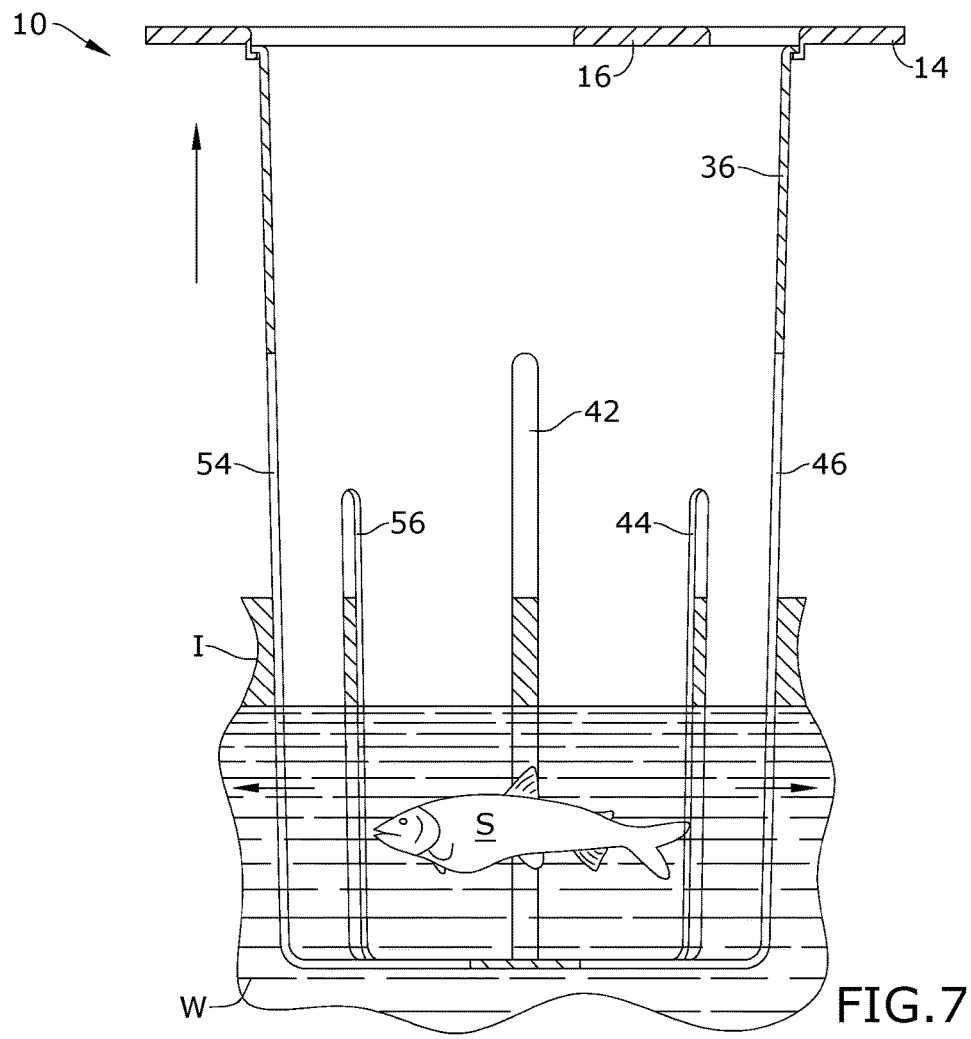
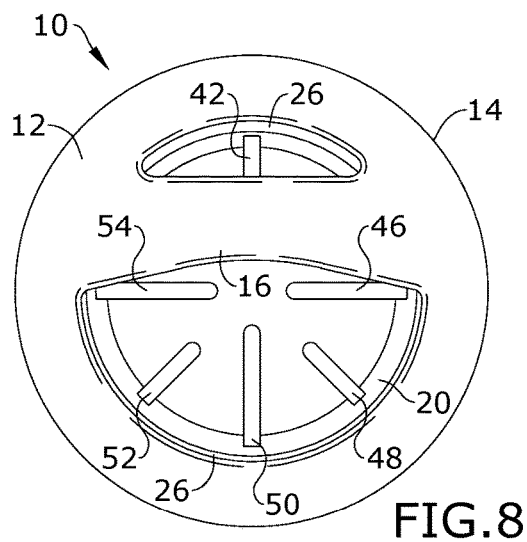
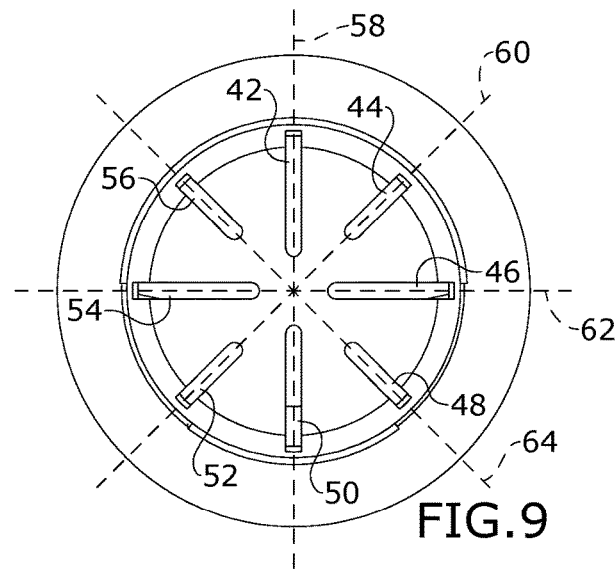

PORTABLE LIVE WELL FOR ICE FISHING

RELATED APPLICATION

This application is a continuation in part of U.S. non-provisional patent application Ser. No. 15/385,547 filed on Dec. 20, 2016, which, in turn, claims priority to provisional patent application U.S. Ser. No. 62/276,096 filed on Jan. 7, 2016. The entire contents of both applications are herein incorporated by reference.

BACKGROUND

The embodiments herein relate generally to a portable live well for keeping a fish alive caught during ice fishing. Prior to the present invention, the portable live wells were made of flexible and stretchable materials forming a mesh, such as nylon mesh. These live wells are difficult to remove from an ice hole since the fishes cause the mesh to bulge at bottom. Further, since the mesh material do not provide any insulation, the mesh begins to freeze immediately after removing from the ice hole. Furthermore, the mesh live wells get wet that require drying when not in use.

The present live well, however, solves the abovementioned problems by manufacturing the portable live well using sturdy material, such as plastic, that does not deform and provides insulation. Further, the present live well does not require drying the portable live well after draining water through holes. Finally, the present live well can be securely placed in any standard bucket during transportation.

SUMMARY

A portable live well is configured to fit through a hole in ice above water. The portable live well comprises a lid, mechanically coupled to a body.

The lid further comprises a generally circular lid rim joined to a handle such that there is a large opening and a small opening separated by the handle. The large opening further comprises a large opening outer edge formed by an inner parameter of the generally circular lid rim and a large opening inner edge formed by a first side of the handle. The small opening further comprises a small opening outer edge formed by the inner parameter of the generally circular lid rim and a small opening inner edge formed by a second side of the handle. A large opening outer edge clip is joined to the large opening outer edge. A small opening outer edge clip joined to the small opening outer edge.

The body further comprises a cylindrical wall joined to a bottom side. A rim is joined to a top edge of the cylindrical wall and extending outward from the cylindrical wall. The lid is joined to the body by pushing the large opening outer edge clip and the small opening outer edge clip into the rim.

In some embodiments, the cylindrical wall further comprises a first slot, a second slot, a third slot, a fourth slot, a fifth slot, a sixth slot, a seventh slot and an eighth slot that extend into the bottom side. A first center line bisects the first slot and the fifth slot. A second center line bisects the second slot and the sixth slot. A third center line bisects the third slot and the seventh slot. A fourth center line bisects the fourth slot and the eighth slot. The first center line and the third center line are approximately perpendicular to one another. The second center line and the fourth center line are approximately perpendicular to one another. A first angle is measured clockwise from the first center line to the second center line. The first angle is approximately 45 degrees.

BRIEF DESCRIPTION OF THE FIGURES

The detailed description of some embodiments of the invention is made below with reference to the accompanying figures, wherein like numerals represent corresponding parts of the figures.

FIG. 7 shows a detail section view of one embodiment of the present invention;

FIG. 8 shows a top view of one embodiment of the present invention; and

FIG. 9 shows a bottom view of one embodiment of the present invention.

DETAILED DESCRIPTION OF CERTAIN EMBODIMENTS

Figure 1:
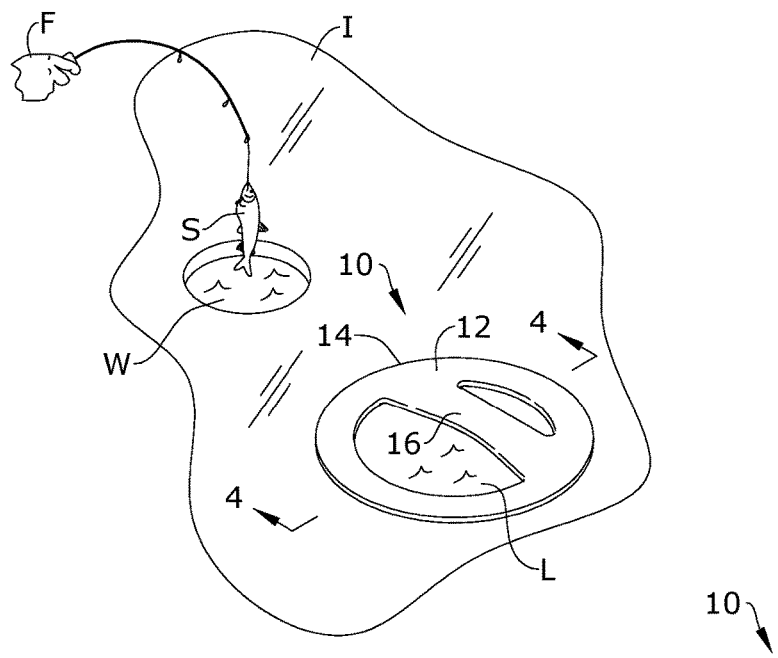
FIG. 1 shows a perspective view of one embodiment of the present invention shown in use.
Figure 2:
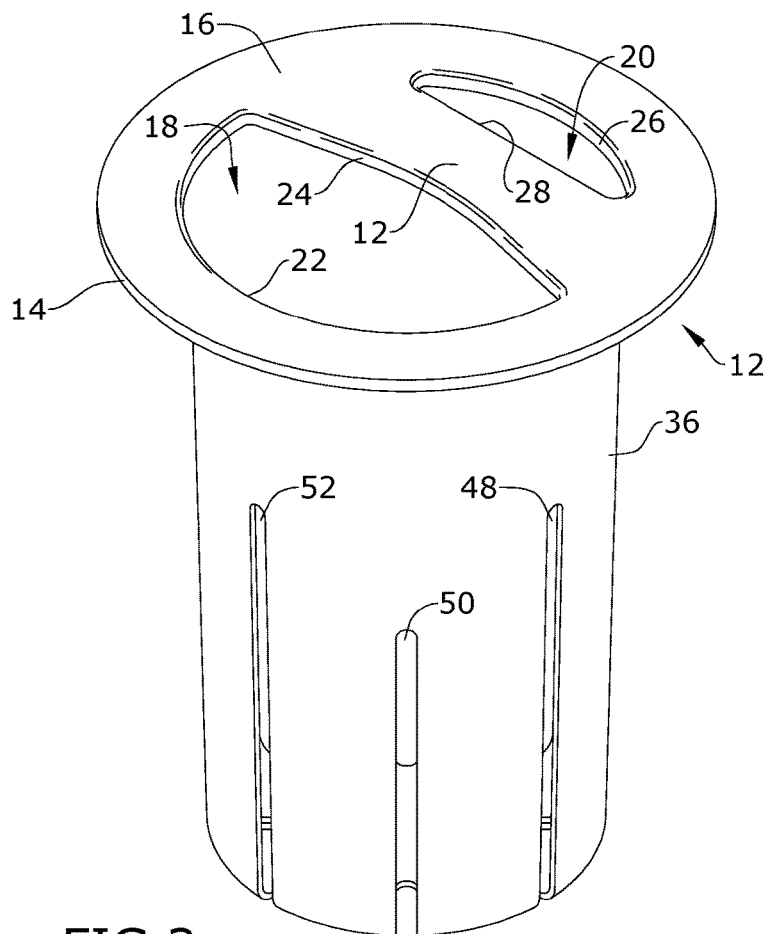
FIG. 2 shows a top perspective view of one embodiment of the present invention.
Figure 3:
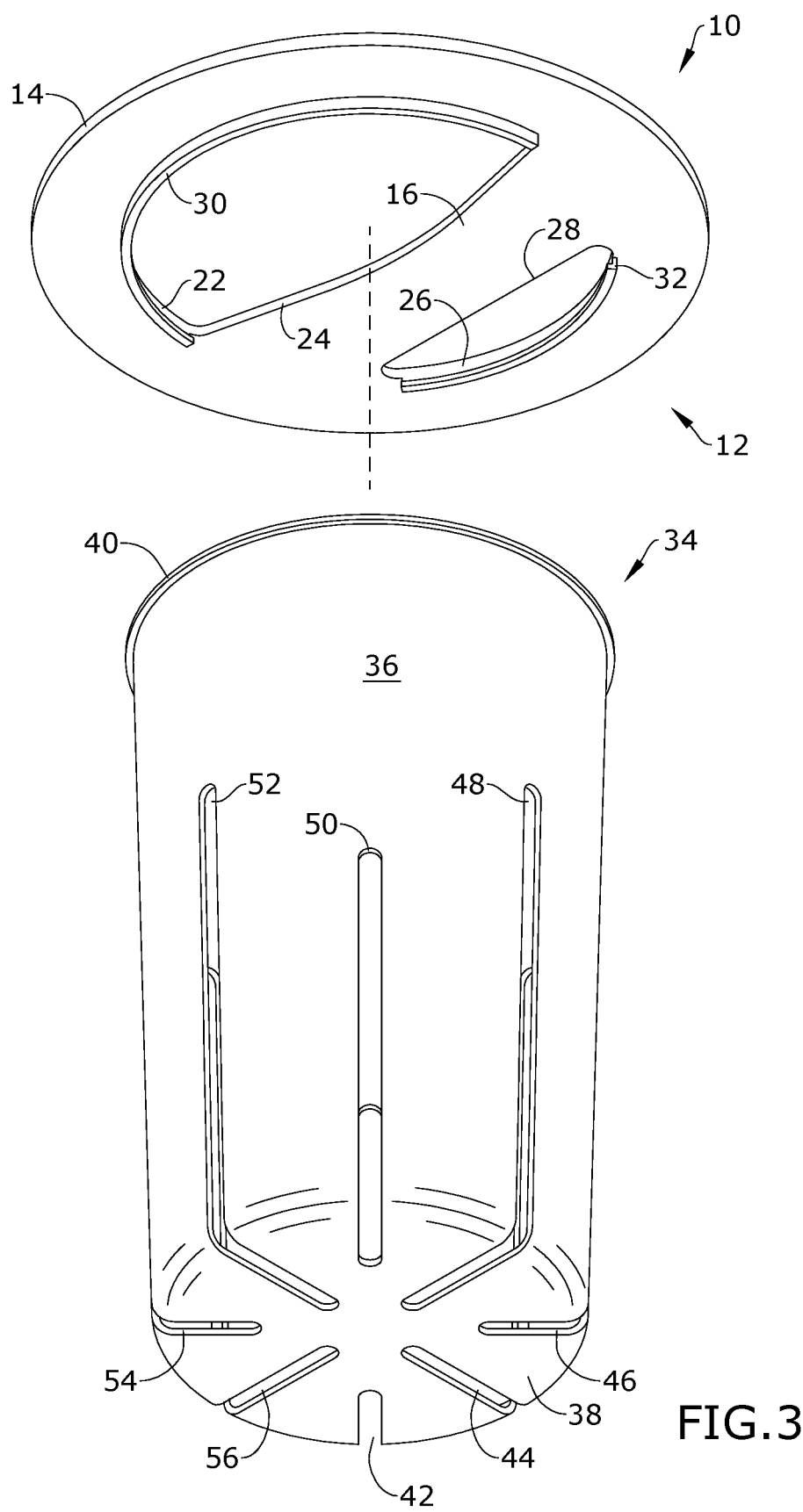
FIG. 3 shows a bottom perspective exploded view of one embodiment of the present invention.
Figure 4:
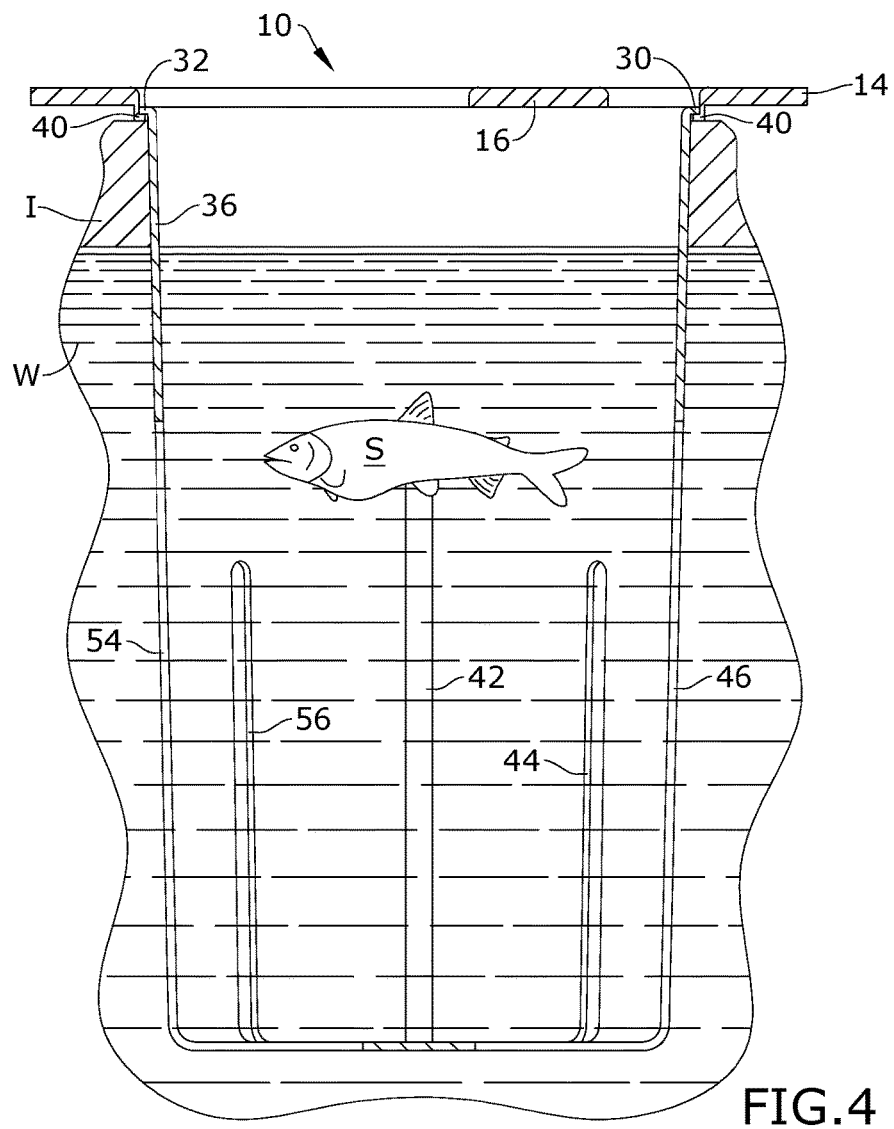
FIG. 4 shows a section view of one embodiment of the present invention shown in use taken along line 4-4 in FIG. 1.

By way of example, and referring to FIG. 1, a fisher F is fishing on an ice surface I through which an ice well hole W and a live well hole L are cut. In use, a live well 10 that can be a portable live well is inserted into the live well hole L. When the fisher F catches a fish S, the fish S is transferred into the live well 10.

The live well 10 further comprises a lid 12. The lid 12 is generally circular and further comprises a generally circular lid rim 14 joined to a handle 16. The generally circular lid rim 14 is joined to a handle 16 such that there is a large opening 18 and a small opening 20 separated by the handle 16.

The large opening 18 further comprises a large opening outer edge 22 formed by the inner parameter of the generally circular lid rim 14 and a large opening inner edge 24 formed by a first side of the handle 16. The small opening 20 further comprises a small opening outer edge 26 formed by the inner parameter of the generally circular lid rim 14 and a small opening inner edge 28 formed by a second side of the handle 16.

The large opening outer edge 22 is joined to a large opening outer edge clip 30. The small opening outer edge 26 is joined to a small opening outer edge clip 32.

Figure 5:
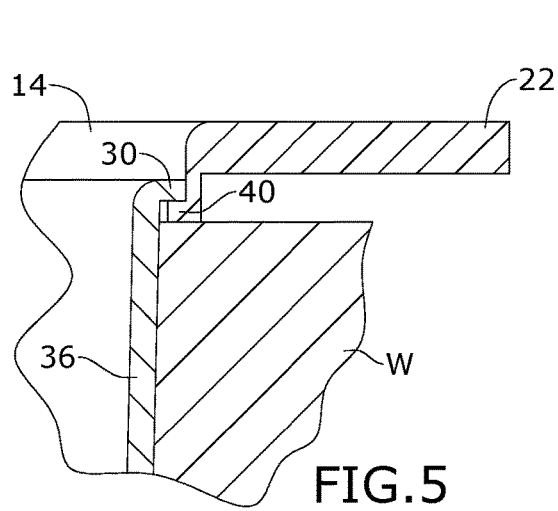
FIG. 5 shows a detail section view of one embodiment of the present invention.
Figure 6:
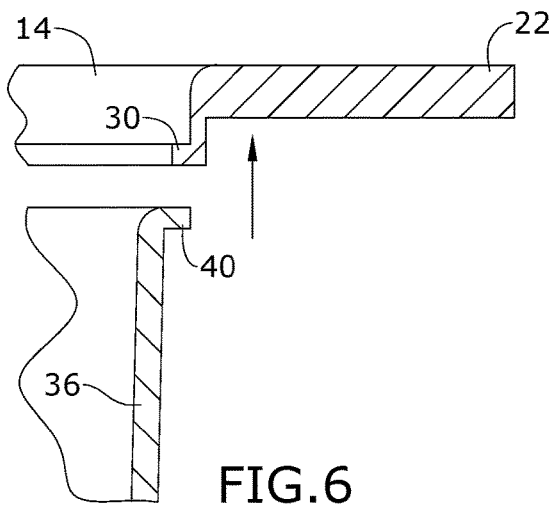
FIG. 6 shows a detail section view of one embodiment of the present invention.

The lid 12 is mechanically coupled to a body 34. The body 34 further comprises a cylindrical wall 36 joined to a bottom side 38. A top edge of the body 34 is joined to a rim 40 extending outward from the cylindrical wall 36. As shown in FIG. 5 and FIG. 6, to assemble the live well 10 press the lid 12 into the body 34 such that the small opening outer edge clip 32 mates with the rim 40 and the large opening outer edge clip 30 mates with the rim 40.

The cylindrical wall 36 further comprises a first slot 42, a second slot 44, a third slot 46, a fourth slot 48, a fifth slot 50, a sixth slot 52, a seventh slot 54 and an eighth slot 56 that extend into the bottom side 38. The first slot 42 is bisected by a first center line 58 that further bisects the fifth slot 50. The second slot 44 is bisected by a second center line 60 that further bisects the sixth slot 52. The third slot 46 is bisected by a third center line 62 that further bisects the seventh slot 54. The fourth slot 48 is bisected by a fourth center line 64 that further bisects the eighth slot 56.

The first center line 58 and the third center line 62 are approximately perpendicular to one another. The second center line 60 and the fourth center line 64 are approximately perpendicular to one another. A first angle θ1 measured clockwise from the first center line 58 to the second center line 60. The first angle θ1 is approximately 45 degrees and the other angles can be determined from that point with Euclidean geometry.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A portable live well, configured to fit through a hole in ice above water; the portable live well comprising:
    a lid, mechanically coupled to a body;
    the lid further comprising:
        a generally circular lid rim joined to a handle such that there is a large opening and a small opening separated by the handle; wherein the larger opening is larger than the smaller opening; wherein:
        the large opening further comprises a large opening outer edge formed by an inner perimeter of the generally circular lid rim and a large opening inner edge formed by a first side of the handle; and
        the small opening further comprises a small opening outer edge formed by the inner perimeter of the generally circular lid rim and a small opening inner edge formed by a second side of the handle; wherein the small opening and large opening are configured to provide access to the water below the ice;
        a large opening outer edge clip, joined to the large opening outer edge and extending therefrom;
        a small opening outer edge clip, joined to the small opening outer edge and extending therefrom;
    the body further comprising:
        a cylindrical wall joined to a bottom side; and
        a rim, joined to a top edge of the cylindrical wall and extending outward from the cylindrical wall;
    wherein the lid is joined to the body by pushing the large opening outer edge clip and the small opening outer edge clip into the rim.

2. The portable live well of claim 1, wherein the cylindrical wall further comprises
    a first slot, arranged in the body and extending from a central area on the bottom side upward on the cylindrical wall in a first L-shape having a first height;
    a second slot, arranged in the body and extending from the central area on the bottom side upward on the cylindrical wall in a second L-shape having a second height; wherein the first height is greater than the second height;
    a third slot, a fourth slot, a fifth slot, a sixth slot, a seventh slot and an eighth slot that extend into the bottom side.

3. The portable live well of claim 2, further comprising:
    a first center line, bisecting the first slot and the fifth slot;
    a second center line, bisecting the second slot and the sixth slot;
    a third center line, bisecting the third slot and the seventh slot; and
    a fourth center line, bisecting the fourth slot and the eighth slot.

4. The portable live well of claim 3, wherein:
    the first center line and the third center line are approximately perpendicular to one another;
    the second center line and the fourth center line are approximately perpendicular to one another.

5. The portable live well of claim 4, wherein a first angle is measured clockwise from the first center line to the second center line; wherein the first angle is approximately 45 degrees.

\* \* \* \* \*